INVENTORS
ERWIN A. SCHUMACHER
MILTON B. CLARK
LAWRENCE J. ULINE
HELIO A. TRULL
BY
ATTORNEY

United States Patent Office 3,355,327
Patented Nov. 28, 1967

3,355,327
ELECTRODE FOR A FLOWING FILM OF LIQUID MATERIAL
Erwin A. Schumacher, Cleveland, Milton B. Clark, North Royalton, and Lawrence J. Uline, Lakewood, Ohio, and Helio A. Trull, St. Petersburg, Fla., assignors to Union Carbide Corporation, a corporation of New York
Filed Dec. 23, 1963, Ser. No. 332,687
8 Claims. (Cl. 136—86)

This invention concerns an electrode suitable for use in an electrochemical cell with a flowing film of liquid material, and particularly refers to an anode for an anodic material amalgam-oxidant fuel cell, such as a sodium amalgam-oxidant fuel cell.

In a sodium amalgam-oxidant fuel cell, the anodic liquid sodium amalgam is usually introduced on the top of the anode and then permitted to flow down the anode face. This procedure presents a large area of anodic material to the electrolyte for electrochemical oxidation, an oxidant, such as oxygen, chlorine, bromine, and the like, being supplied to a cathode disposed nearby. The anode may consist of a flat plate made of a conductive material substantially inert to the cell environment, and steel may be used as the conductive material since it is wettable by the liquid sodium amalgam, conductive, and substantially inert to the usual cell electrolyte, an aqueous solution containing sodium hydroxide.

As used herein, the terms "electrode," "anode," and "cathode" refer to an electrically conductive, substantially inert support or base over which a liquid material flows. The liquid material may be either electrochemically active or electrochemically inert depending on the particular cell in question. The terms "inert" and "active" refer to a degree of activity in a particular cell environment, and do not refer to a universal degree of activity. Furthermore, these terms refer to the principal electrochemical reaction in the cell. For example, during the electrolysis of sodium chloride, a flowing mercury cathode will assimilate the sodium produced in the cell reaction, and then exhibit a potential based on the sodium amalgam although no current will flow in the direction of this potential. For purposes herein, the sodium amalgam in this case will not be considered active since it is not involved in the principal electrochemical reaction.

For good cell operation, the anode must be completely and uniformly covered by the flowing anodic sodium amalgam. If parts of the anode are not covered with the amalgam, the cell will lose efficiency, and in some cases, gassing will result from wasteful corrosion of the sodium with the electrolyte. Maintenance of a uniform film of sodium amalgam on the anode surfaces is a problem encountered with sodium amalgam-oxidant fuel cells, but the problem is particularly prevalent when the cell is subjected to pitch and roll, as in an installation on a boat or a vehicle operating on rough terrain. This problem also exists with respect to other electrochemical devices which comprise an electrode with a flowing film over the electrode face, such as a flowing mercury cathode.

The primary object of the invention, therefore, is to provide an electrode suitable for use with a liquid material, which electrode causes the active material supplied to it to establish and maintain a substantially uniform film over the main electrode surfaces. Another object is to provide an improved anode for an anodic material amalgam-oxidant fuel cell.

Still another object is to provide a uniquely effective surface which affords lateral movement of the amalgam over vertically disposed surfaces.

A further object is to provide a surface conducive to lateral spread of amalgam while the electrode is subject to displacement from the normal vertical orientation.

Broadly, the above objects are achieved by an electrode comprising a substantially flat plate made of a conductive material substantially inert to the cell environment and having holes and channels so positioned and arranged therein as to enhance the ability of the plate to establish and maintain contact with the liquid material supplied to it. The plate has a plurality of channels extending in a vertical direction on each of its main sides and a plurality of holes over the main sides of the plate, each of which communicate with at least one of the channels. Those in the art will realize that the construction of the invention is also applicable to cylindrical electrodes as well as the flat plate electrodes described specifically herein. In general, the electrode may be described as a relatively thin body having two main sides, but the construction of the invention is also applicable to a number of shapes.

The invention will be better understood by reference to the drawing, in which.

Figure 1:
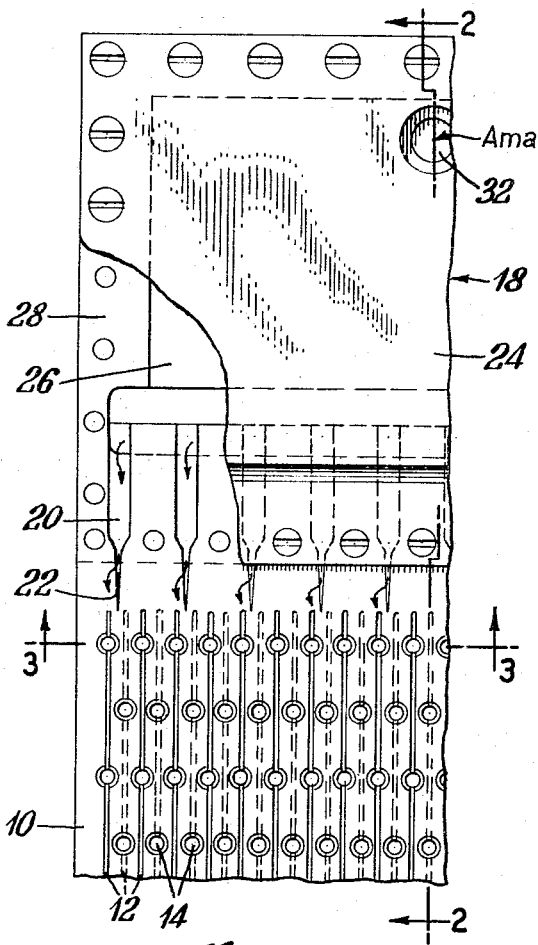
FIG. 1 is a fragmentary perspective view of an anode made in accordance with the invention.

As shown in FIG. 1, the preferred electrode of the invention comprises a substantially flat plate 10, preferably having a rough surface formed by shot blasting, metal spraying, etching, engraving, or the like, with a plurality of channels 12 on each side of the plate 10 and extending vertically for substantially the entire length of the plate 10. The flat plate 10 may be also made of a porous metal plate. The channels 12 on one side of the plate 10 are preferably disposed intermediate the channels 12 on the other side of the plate 10, as shown in the drawing. A plurality of openings 14 between the two main sides of the plate 10 communicate with the channels 12, and preferably form horizontal rows of openings with each opening in a row centered on one of the channels 12 on the one side and with each opening in the next row centered on one of the channels 12 on the other side. Although this arrangement of openings is preferred, other arrangements will be suitable as long as each opening communicates with at least one channel.

Figure 3:
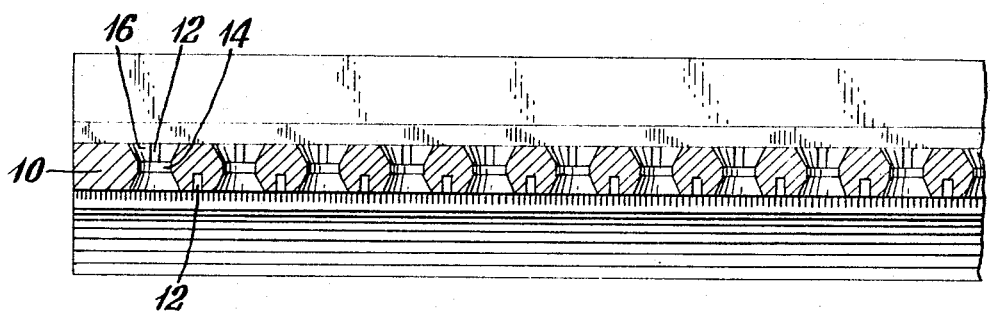
FIG. 3 is a sectional view of the anode of FIG. 1 taken along line 3—3.

FIG. 3 shows an enlarged view of a section taken along a horizontal row of openings 14, as indicated by line 3—3 in FIG. 1. As there shown, the channels 12 are preferably rectangular in shape, although V shapes and other shapes may be employed, and the openings 14 preferably have a chamfer 16 at each side of the plate 10. The chamfer 16 need not necessarily be a straight bevel as shown, but may be arcuate in shape or a discontinuous surface. The openings 14 in combination with the channels 12 provide a means by which the masses of amalgam or other liquid material flowing down each side of the plate 10 can intermix and thereby hold to each other as well as to the plate 10. Thus, a uniform, continuous film of liquid material is provided over the electrode surfaces. In addition, the channels 12 and the openings 14 help to disperse the liquid material equally over the electrode surfaces in spite of pitch and roll. The chamfer 16 permits an easier entrance of the liquid material into the opening 14 and thus causes better mixing of the two masses of flowing liquid material.

Figure 2:
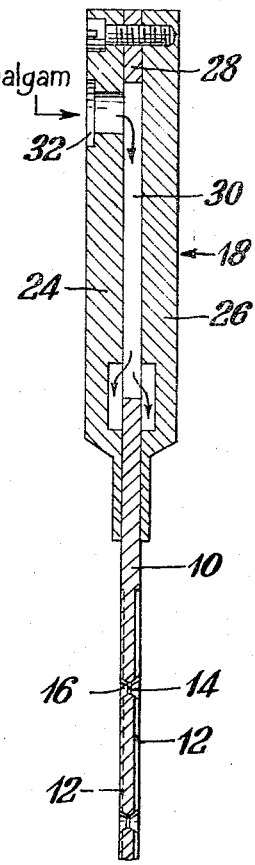
FIG. 2 is a sectional view of the anode of FIG. 1 taken along line 2—2.

Near the top of the plate 10 is a header means 18 for introducing the liquid material to both sides of the plate 10. This header means 18 can be constructed in any suitable manner, but the construction shown in the drawing, which can be conveniently made, works very well. The plate 10 is extended above its channels 12 and openings 14, and a plurality of elongated holes 20 are cut therein beginning at the top of the plate 10 and extending down to a point a short distance above the channels 12. Small passages 22 are then machined into each side of the plate 10 from the bottom of the elongated holes 20 to a point immediately above the channels 12. As better shown in FIG. 2, two header plates 24 and 26 are then secured by screws or other means to the extended portion of the plate 10, one on each side, and are also secured to each other with a spacer 28 between the two at the outside edges. This construction defines a chamber 30 which communicates with the elongated holes 20 in the extended portion of the plate 10.

When a liquid material, such as sodium amalgam, is introduced into the space 30 through an inlet 32 in one of the header plates 24 and 26, the material will flow through the chamber 30, enter the elongated holes 20, and then flow out to both sides of the plate 10 through the small passages 22 spaced across each side of the plate 10. The flowing liquid will then form a substantially uniform and continuous film over both sides of the plate 10 due to the channels 12 and the openings 14 provided in the plate 10.

The exact spacing of the channels 12 and openings 14 depends on the rate of flow of the liquid material, the size of the electrode, and the material of which the electrode is made. The optimum spacings, however, can be easily determined for a specific use. In general, for an electrode plate 12 inches across and 14 inches long, the channels on each side are spaced in the range of about $\frac{1}{4}$ and $1\frac{1}{2}$ inches apart and are preferably $\frac{1}{2}$ inch apart, and the horizontal rows of openings centered on channels on one side between about $\frac{1}{2}$ and 2 inches apart. The dimensions of the channels are preferably about $\frac{1}{32}$ inch wide and about $\frac{1}{32}$ inch deep, and each opening is made with about a $\frac{1}{8}$ inch drill and about a $\frac{3}{16}$ inch drill countersink.

An anode for a sodium amalgam-oxygen fuel cell made in accordance with the invention was successfully operated, and the results indicated that the electrode of the invention definitely improves the efficiency of cell operation and voltages which exist over the electrode face, as compared with other constructions, such as single flat plates and plates having channels in a herringbone or crosshatched pattern, by maintaining a uniform film of sodium amalgam on the anode surface, even during conditions of pitch and roll. Other liquid anodic material amalgams, such as those of the other alkali or alkaline earth metals, zinc, cadmium, tin, and lead, will also operate similarly.

The electrode of the invention can be made of any material as long as the material is conductive, wettable by the liquid material which flows down the electrode face and substantially inert to the liquid material. Low carbon steels, such as those having between about 0.005 and 0.1 weight percent carbon and being substantially free of heavy metals like nickel, chromium, and copper, are preferred, especially for use with the amalgam.

It is to be understood that certain details in the specific construction of the electrode described herein may be altered or omitted depending upon the nature and means of supplying the liquid material to the electrode. For example, the header arrangement shown and described may be omitted when the liquid is supplied to the electrode by moving the electrode through a pool of the liquid material, such as might be accomplished in the case of a moving or rotating mercury cathode.

What is claimed is:

1. In an anodic material amalgam-oxidant fuel cell comprising an anode, a cathode, and an electrolyte in electrochemical relationship with the two, the improvement for maintenance of a substantially uniform film of said amalgam on said anode, which improvement in combination therewith consists of an anode comprising a relatively thin body made of a conductive material substantially inert to the cell environment; said body having a plurality of spaced parallel channels on each main side of said body and extending vertically for substantially the entire length of said body and having a plurality of spaced openings between and extending to the two main sides of said body, each of said openings communicating with at least one of said channels; and header means near the top of said body for introducing said amalgam to the sides of said body.

2. The improvement defined in claim 1 wherein the channels on one side of said body are disposed intermediate the channels on the other side of said body and wherein said openings are arranged in parallel rows extending in a horizontal direction, each opening in a row being centered on one of said channels on one side with each opening in the next row being centered on one of said channels on the other side, and each opening being chamfered at each side of said body.

3. In an electrochemical cell, the improvement in combination therewith comprising an electrode formed of a relatively thin conductive body substantially inert to the cell environment, an electrically conductive flowing liquid, said body comprising at least two main surfaces to be wetted by said liquid and a plurality of spaced parallel channels on each of said two main surfaces and having a plurality of spaced openings between and continuously extending to each of said two main surfaces with each of said openings communicating with at least one of said channels, both said channels and said openings similarly extending over the entire area of said surfaces to be wetted.

4. The electrode defined in claim 3 wherein said conductive body comprises low carbon steel.

5. The electrode defined in claim 3 wherein the channels on one of said surfaces are disposed intermediate the channels on the other of said surfaces.

6. The electrode defined in claim 3 including header means near the top of said body for introducing said liquid to the surfaces to be wetted.

7. The electrode defined in claim 3 wherein said channels are arranged in vertical rows and said openings are arranged in horizontal parallel rows, each opening in a row being centered on one of said channels on one surface and each opening in the next row being centered on one of said channels on the other surface.

8. The electrode defined in claim 3 wherein each opening is chamfered at each end thereof adjacent said surfaces.

References Cited

UNITED STATES PATENTS

| | | | |
|---|---|---|---|
| 1,970,975 | 8/1934 | Palmaer et al. | 204—219 X |
| 2,691,628 | 10/1954 | Aannerud | 204—283 |
| 2,849,393 | 8/1958 | Deprez et al. | 204—219 |
| 3,161,546 | 12/1964 | Yeager et al. | 136—86 |

OTHER REFERENCES

Mitchell, W. Fuel Cells, Academic Press, New York and London (1963), page 318 relied on.

WINSTON A. DOUGLAS, *Primary Examiner.*

N. P. BULLOCH, O. F. CRUTCHFIELD,

*Assistant Examiners.*